United States Patent
Ratliff, Jr.

(10) Patent No.: US 6,601,624 B2
(45) Date of Patent: Aug. 5, 2003

(54) TREAD GROOVE NOISE DIFFUSERS

(75) Inventor: Billy Joe Ratliff, Jr., Akron, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 98 days.

(21) Appl. No.: 09/903,056

(22) Filed: Jul. 11, 2001

(65) Prior Publication Data

US 2003/0010417 A1 Jan. 16, 2003

(51) Int. Cl.⁷ .................. B60C 11/13; B60C 103/00; B60C 115/00
(52) U.S. Cl. ............... 152/209.19; 152/209.26; 152/209.28
(58) Field of Search .............. 152/209.18, 209.17, 152/209.19, 209.26, 209.28, 209.1, 902, DIG. 1; D12/553–567

(56) References Cited

U.S. PATENT DOCUMENTS

| | | | |
|---|---|---|---|
| 4,345,632 A | * | 8/1982 | Takigawa et al. |
| 5,176,766 A | * | 1/1993 | Landers et al. |
| 5,609,699 A | * | 3/1997 | Himuro |
| D402,945 S | * | 12/1998 | Maxwell et al. |
| 6,164,354 A | * | 12/2000 | Yamakage |

FOREIGN PATENT DOCUMENTS

| | | | |
|---|---|---|---|
| FR | 402860 | * | 10/1909 |
| FR | 1163341 | * | 9/1958 |
| JP | 3-132403 | * | 6/1991 |
| JP | 5-286419 | * | 11/1993 |
| JP | 5-338414 | * | 12/1993 |
| JP | 6-48119 | * | 2/1994 |

OTHER PUBLICATIONS

Boltze et al, "New Ways To Combat Hydroplaning–Developing The Aqua contact", Meeting of the Rubber Division, American Chemical Society, May 19–22, 1992.*

* cited by examiner

*Primary Examiner*—Steven D. Maki
(74) *Attorney, Agent, or Firm*—David E. Wheeler; Nancy T. Krawczyk

(57) ABSTRACT

A tire tread comprises an intermediate portion disposed between two shoulder portions. The tire tread has an expanded void area with a width and length of 1.2 to 5 times the average width of a non-circumferential groove in the tread. In the illustrated embodiment, the expanded void area is in the intermediate portion of the tread and the void area is divided into two branches which are separated by an island of tread rubber. The illustrated island has a length and a variable width, and has rounded leading and trailing ends. The island is also disposed at an angle with respect to the centerline (CL) of the tread. In the illustrated embodiment, the tread has a circumferential aquachannel, and the islands and the aquachannel are in close proximity to one another.

9 Claims, 3 Drawing Sheets

TREAD GROOVE NOISE DIFFUSERS

FIELD OF THE INVENTION

The invention relates to a tread for a pneumatic tire.

BACKGROUND OF THE INVENTION

It is a continuing goal in the art to produce tire tread designs that exhibit desirable properties with regard to traction, handling, braking and high speed performance while providing tires with a quieter and smoother ride. These properties, however, sometimes work against one another. For example, tires that have an aggressive tread pattern for wet and snow traction have a tendency to be noisier than tires that are designed for a smooth ride on smooth pavement.

Larger circumferential grooves and lateral grooves, and more open void areas in a tire help improve wet and snow traction, especially when the open void areas are in close relationship to large circumferentially-oriented grooves or aquachannels, or are positioned near the center of the tires. Large void areas, however, have a tendency to create more noise as the tire tread strikes the pavement.

The presence of void areas in the center of the tire, nevertheless, is important because water tends to build up in front of the tire at higher speeds (important for wet traction).

SUMMARY OF THE INVENTION

A tire tread has non-circumferential grooves, and void areas having a length and width of 1.2 to 5 times the average width of the non-circumferential grooves in the tread.

In the illustrated embodiment, the void areas are divided into branches, and the branches are separated by an island of tread rubber. The island has a variable width and rounded leading and trailing ends. The illustrated tire tread has a circumferential aquachannel which is disposed on the centerline of the tread and the island areas are located near the aquachannel. The island areas are angled with respect to the centerline of the tread.

BRIEF DESCRIPTION OF THE DRAWINGS

The invention will be described by way of example and with reference to the accompanying drawings in which.

DEFINITIONS

"Center Plane" means the plan perpendicular to the axis of rotation of the tread and passing through the axial center of the tread. The intersection of the Center Plane with the tread forms the center line CL.

"Circumferential" means lines or directions extending along the perimeter of the surface of the annular tread perpendicular to the axial direction.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant, but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Leading" refers to a portion or part of the tread that contacts the ground first, with respect to a series of such parts or portions, during rotation of the tire in the direction of travel.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load.

"Rib" means a circumferentially extending strip of rubber on the tread which is defined by at least one circumferential groove and either a second such groove or a lateral edge, the strip being laterally undivided by full-depth grooves.

"Shoulder" means the upper portion of a sidewall just below the tread edge. Affects cornering.

"Tread element" or "traction element" means a rib or a block element.

"Trailing" refers to a portion or part of the tread that contacts the ground last, with respect to a series of such parts or portions during rotation of the tire in the direction of travel.

"Tread" means a molded rubber component which, when bonded to a tire casing, includes that portion of the tire which comes into contact with the road when the tire is normally inflated and under normal load.

"Tread width" means the arc length of the tread surface in the axial direction, that is, in a plane passing through the axis of rotation of the tire.

"Undertread" or "tread base" refers to a layer of rubber placed between a reinforcement package and the tread rubber in a tire.

DETAILED DESCRIPTION OF THE PREFERRED EMBODIMENTS

Figure 1:
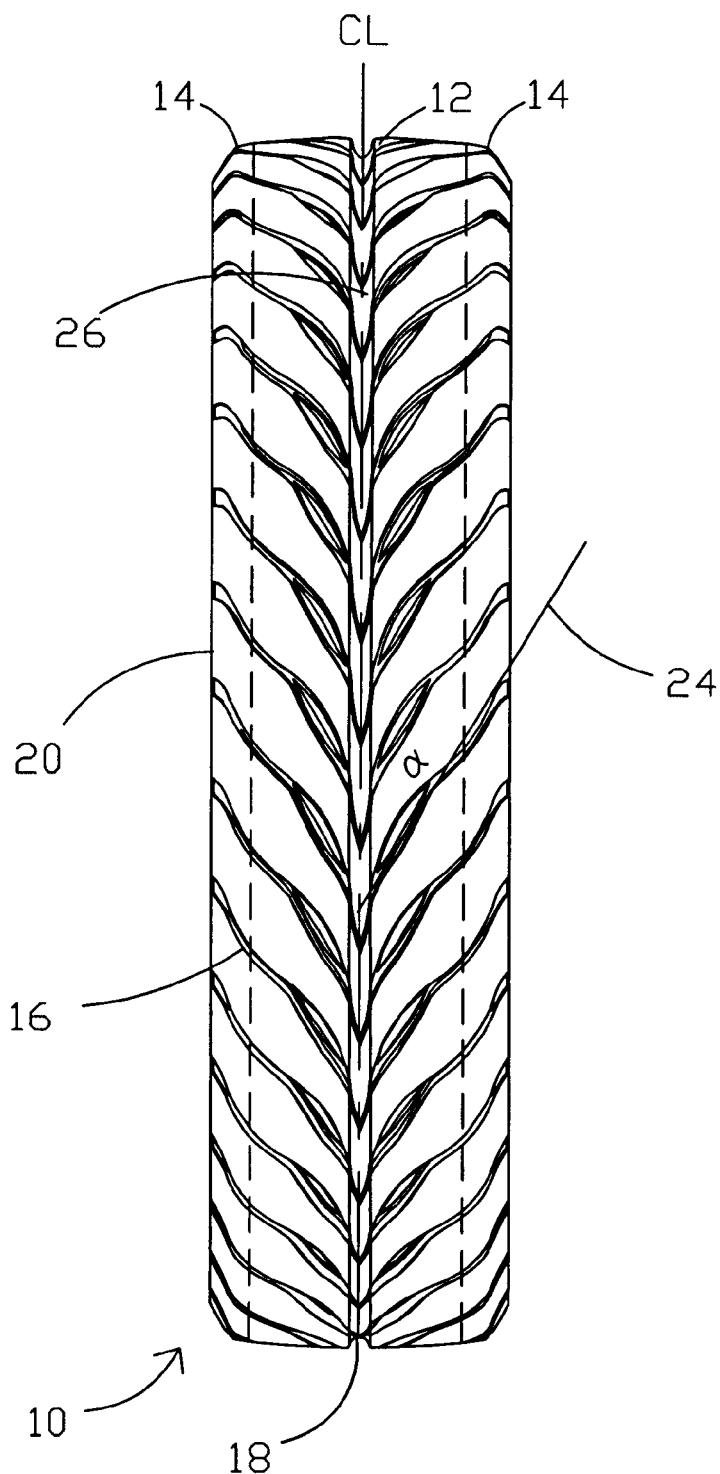
FIG. 1 illustrates a front elevational view of an illustrated embodiment of the tire tread of the invention.

A tire tread of the invention comprises tread rubber having non-circumferential grooves and void areas having a length and width of 1.2 to 5 times the average width of the non-circumferential grooves. In FIG. 1, in an illustrated embodiment of the invention, a frontal view of a tire tread (10) is shown which is divided into an intermediate portion (12) which is disposed between two shoulder portions (14). The tire tread has non-circumferential grooves (16) which are substantially continuous from the area of the center (18) of the tread to a shoulder (20).

Although, in the illustrated embodiment, non-circumferential grooves (16) are at an angle of 30° to 60° relative to the centerline (CL) of the tire, those skilled in the art will recognize that the grooves may have an angle of ±5° up to 90° with respect to the centerline (CL). Also, although the grooves are illustrated as being continuous, those skilled in the art will recognize that the grooves may be off-set in different zones of the tire tread.

The tread may optionally also contain circumferential grooves. Circumferential grooves, by definition, have an angle of 0° with respect to the centerline of the tire.

Figure 2:
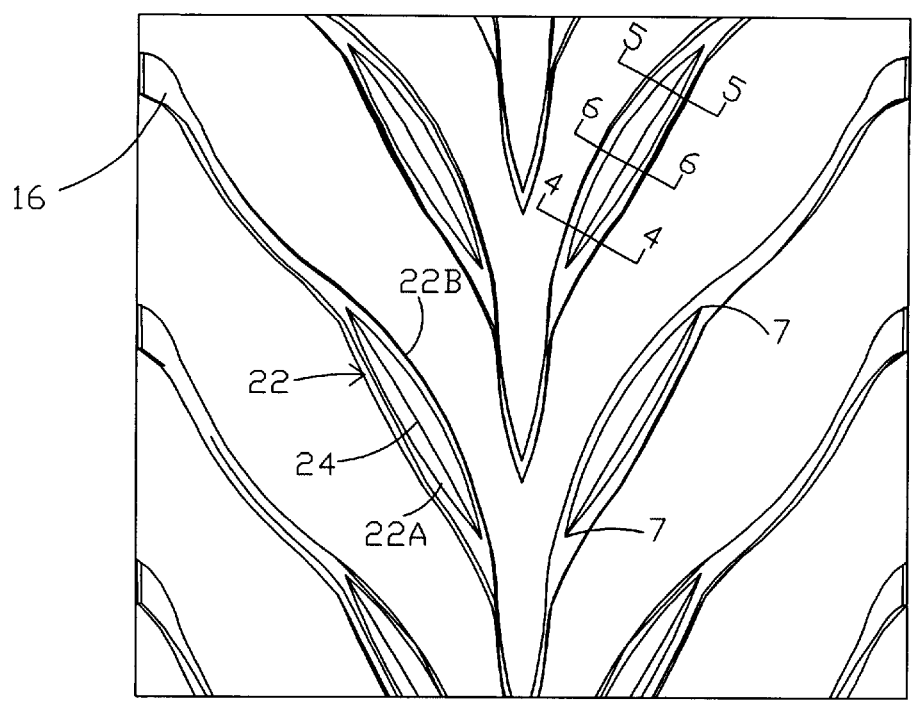
FIG. 2 illustrates an enlarged view of a section of the tread of the illustrated embodiment of the invention.

With reference to FIGS. 1 and 2, grooves (16) are branched. The expanded portion (22) of grooves (16) provide void areas which are divided into two portions (22A, 22B) which surround an island (24) of tread rubber. Island (24) has a length and a width, and the length direction of island (24) is disposed at an angle α of 15° to 85° with respect to the centerline (CL) of the tire tread.

The angle of the island with respect to the centerline (CL) of the tire, especially in those embodiments where the island has a substantially linear shape, provides a buttressing effect on the island, since different parts of the island enter the footprint at different times.

Figure 4:
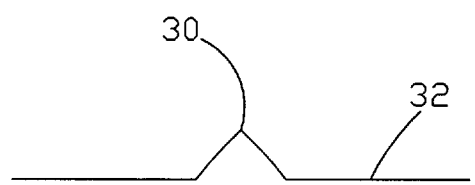
FIG. 4 illustrates a profile of an island taken along the line 4—4 of FIG. 2.
Figure 5:
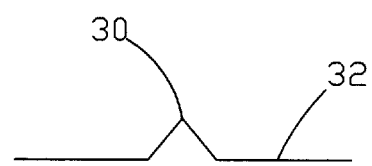
FIG. 5 illustrates a profile of an island taken along the line 5—5 of the tread of FIG. 2.
Figure 6:
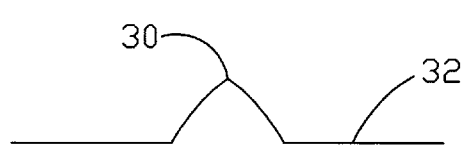
FIG. 6 illustrates a profile of an island taken along the line 6—6 of FIG. 2.
Figure 7:
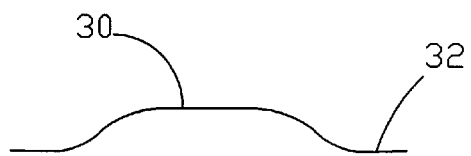
FIG. 7 illustrates a profile of an island taken along the line 7—7 of FIG. 2.
Figure 3:
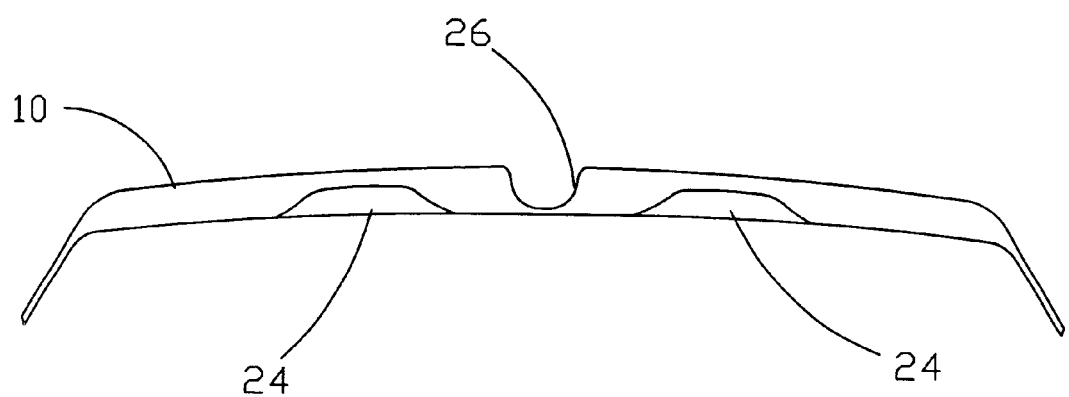
FIG. 3 illustrates a cross-section of an illustrated tread of the invention.

With reference to FIGS. 3–7, in the illustrated embodiment, island (24) has a variable width and height, as is represented by the cross-section of island (24) shown in FIGS. 3, 4, 5 and 6, and has rounded leading and trailing ends as is illustrated in FIG. 7. As shown in FIGS. 4, 5 and 6, the cross section of the illustrated island shows a higher and wider portion in the center, as illustrated along line 6—6, and slightly lower and narrower portions near the ends, as illustrated along lines 4—4 and 5—5. The island (24) is provided to help diffuse the buildup of repetitive sound/air vibrations that may be generated when a tire tread is in movement against a road surface. It is believed that when a sound vibration comes in contact with an angled surface or wall of island (24), the angled surface deflects the noise by bouncing the sound vibration at an angle into the enclosed, or partially enclosed area which is defined by branches (22A, 22B) of the void area defined by expanded groove (22). Because of this deflection, the sound vibrations are not able to travel in the same direction at the same speed, and thus are less likely to build an amplitude that will breach the threshold of hearing. It is believed that some of the sound waves will also cancel each other out as the wave is altered or shifted by the reflection.

Also, the angled islands (24), regardless of their angle, will catch light and shadow in different ways as compared to the surrounding tread grooves and blocks, and thus will provide a unique distinctive, more aggressive appearance.

Although a specific shape has been illustrated for island (24), those skilled in the art will recognize that variations of the shape of the cross-section widths of island (24), and the contour of the ends, as well as the linearity of island (24), may be varied depending on the requirements of a tread design. For example, island (24) may have a length which comprises an "S" shape, and a profile may be provided where the central portion defined by section lines 6—6 may be narrower and shorter than the end portions defined by section lines 4—4 and 5—5. The island may also have a substantially triangular shape, if desired, for a specific design application.

One important aspect of the island is the sloped sides from its top (30) to the tread base (32). Although illustrated in the figures as having rounded leading and trailing ends, those skilled in the art will recognize that chamfered or ramped ends can also be used.

Although the straight, angled sides illustrated in FIGS. 4–6 are preferred for their sound reflecting properties, those skilled in the art will recognize that more rounded or bulging sides may also be used for diffusing sound.

Other modifications of the profile shape of island (24) will be apparent to those skilled in the art.

The island may have a height that positions its top surface below the surface of the rest of the tread, and in those applications where a triangular or some other geometrically shaped island is used, it is preferred that the top surface be below the surface of the tread. In such embodiments, the height of the island will be 33% to 50% of the tread height.

In the illustrated embodiment, the tire tread contains an aquachannel (26) which coincides substantially with the centerline (CL) of the tire tread. In the illustrated embodiment, the aquachannel comprises 10% to 20% of the width of the tire tread. Those skilled in the art will recognize that an aquachannel (26) may be asymmetrically oriented within tread (10), i.e., aquachannel (26) may be located anywhere within intermediate portion (12) of the tire tread (10).

The tread designs incorporating the invention may also have a plurality of more conventional circumferential grooves.

What is claimed is:

1. A tire tread comprising tread rubber having a circumferential groove and non-circumferential grooves, the non-circumferential grooves comprising expanded void areas, the expanded void areas have a length and a width of 1.2 to 5 times the average width of the non-circumferential grooves and wherein the expanded void areas are divided to form branches, the branches being separated by an island land area of tread rubber located within the void area, the island land area having a height such that the top surface of the island land area is below the surface of the tread, and the non-circumferential grooves being connected to and extending from the circumferential groove.

2. The tire tread of claim 1 wherein the island land area has a variable width.

3. The tire tread of claim 1 wherein the island land area has rounded leading and trailing ends.

4. The tire tread of claim 3 wherein the circumferential groove is a circumferential aquachannel.

5. The tire tread of claim 4 wherein the circumferential aquachannel is on the centerline of said tread.

6. The tire tread of claim 4 wherein said island land areas are located near said aquachannel.

7. The tire tread of claim 1 wherein the island land areas are angled with respect to the centerline of the tread.

8. The tire tread of claim 7 wherein the island land areas are at an angle of 15° to 85° with respect to the centerline of the tread.

9. The tire tread of claim 1 wherein the island land areas have opposing sloped sides.

* * * * *